(12) United States Patent
Haisch et al.

(10) Patent No.: US 7,379,286 B2
(45) Date of Patent: May 27, 2008

(54) QUANTUM VACUUM ENERGY EXTRACTION

(75) Inventors: Bernard Haisch, Redwood City, CA (US); Garret Moddel, Boulder, CO (US)

(73) Assignee: Jovion Corporation, Menlo Park, CA (US)

( * ) Notice: Subject to any disclaimer, the term of this patent is extended or adjusted under 35 U.S.C. 154(b) by 430 days.

(21) Appl. No.: 11/236,142

(22) Filed: Sep. 26, 2005

(65) Prior Publication Data

US 2007/0241470 A1 Oct. 18, 2007

(51) Int. Cl.
*H02N 11/00* (2006.01)
*H02M 1/00* (2007.01)

(52) U.S. Cl. ............. 361/233; 361/226; 363/178; 327/603; 318/16; 318/555; 318/558; 307/151

(58) Field of Classification Search ............. None
See application file for complete search history.

(56) References Cited

U.S. PATENT DOCUMENTS

| 5,018,180 | A | | 5/1991 | Shoulders | |
|---|---|---|---|---|---|
| 5,590,031 | A | * | 12/1996 | Mead, Jr. et al. | 363/8 |
| 6,477,028 | B1 | * | 11/2002 | Pinto | 361/233 |
| 6,593,566 | B1 | | 7/2003 | Pinto | |
| 6,665,167 | B2 | * | 12/2003 | Pinto | 361/233 |

OTHER PUBLICATIONS

Boyer, T. H. 1975, Random Electrodynamics: The Theory of Classical Electrodynamics with Classical Zero-Point Radiation Field, Phys. Rev. D, 11, 790.
Cole, D. C. and Puthoff, H. E. 1993, Extracting energy and heat from the vacuum, Phys. Rev. E, 48, 2, 1562.
Cole, D. C. and Zou, Yi 2003, Quantum Mechanical Ground State of Hydrogen Obtained from Classical Electrodynamics, Physics Letters A, vol. 317, No. 1-2, pp. 14-20 (Oct. 13, 2003), quant-ph/0307154.

(Continued)

*Primary Examiner*—Nikita Wells
(74) *Attorney, Agent, or Firm*—Pritzkau Patent Group, LLC

(57) ABSTRACT

A system is disclosed for converting energy from the electromagnetic quantum vacuum available at any point in the universe to usable energy in the form of heat, electricity, mechanical energy or other forms of power. By suppressing electromagnetic quantum vacuum energy at appropriate frequencies a change may be effected in the electron energy levels which will result in the emission or release of energy. Mode suppression of electromagnetic quantum vacuum radiation is known to take place in Casimir cavities. A Casimir cavity refers to any region in which electromagnetic modes are suppressed or restricted. When atoms enter into suitable micro Casimir cavities a decrease in the orbital energies of electrons in atoms will thus occur. Such energy will be captured in the claimed devices. Upon emergence form such micro Casimir cavities the atoms will be re-energized by the ambient electromagnetic quantum vacuum. In this way energy is extracted locally and replenished globally from and by the electromagnetic quantum vacuum. This process may be repeated an unlimited number of times. This process is also consistent with the conservation of energy in that all usable energy does come at the expense of the energy content of the electromagnetic quantum vacuum. Similar effects may be produced by acting upon molecular bonds. Devices are described in which gas is recycled through a multiplicity of Casimir cavities. The disclosed devices are scalable in size and energy output for applications ranging from replacements for small batteries to power plant sized generators of electricity.

20 Claims, 7 Drawing Sheets

OTHER PUBLICATIONS

Cole, D. C. and Zou, Yi 2004, Analysis of Orbital Decay Time for the Classical Hydrogen Atom Interacting with Circularly Polarized Electromagnetic Radiation, Phys. Rev. E. 69 (1), 016601, pp. 1-12 (2004).

Forward, R. 1984, Extracting electrical energy from the vacuum by cohesion of charged foliated conductors, Phys. Rev. B, 30, 4, 1700.

Goho, A., "Diatom Menagerie," Science News, vol. 166, Jul. 17, 2004a, pp. 42-44, and references mentioned therein.

Goho, A., "Rattle and Hum; Molecular machinery makes yeast cells purr," Science News, vol. 166, Aug. 21, 2004b, p. 116, and references therein.

Milonni, P. W. The Quantum Vacuum: An Introduction to Quantum Electrodynamics, Sect. 3.3, Academic Press, 1994.

Park, W., and Summers, C. J., "Extraordinary refraction and dispersion in 2D photonic crystal slabs", Opt. Lett., vol. 27, (2002) p. 1397.

Plöl, A. and Kräuter, G., "Wafer direct bonding: tailoring adhesion between brittle materials", Mater. Sci. Eng. R, vol. 25 (1999) p. 1.

Puthoff, H. E., Ground State of Hydrogen as a Zero-Point-Fluctuation-Determined State, Phys. Rev. D 35, 3266, 1987.

Roy, Subrata et al., "Modeling gas flow through microchannels and nanopores," Journal of Applied Physics, vol. 93, No. 8, Apr. 15, 2003, pp. 4870-4879.

* cited by examiner

QUANTUM VACUUM ENERGY EXTRACTION

BACKGROUND OF THE INVENTION

Max Planck proposed the concept of zero-point energy in 1912. The idea was then studied by Albert Einstein and Otto Stern in 1913. In 1916 Walther Nernst proposed that the Universe was filled with zero-point energy. The modern field of stochastic electrodynamics is based upon these ideas.

At that same time the structure and stability of the atom were puzzles. The Rutherford model of the atom was based on analogy to the motions of planets (electrons) around the Sun (the nucleus). However this was not feasible. The orbiting electron(s) would emit Larmor radiation, quickly losing energy and thus spiraling into the nucleus on time scales less than one-trillionth of a second, thereby rendering stable matter impossible. It is now known within the context of stochastic electrodynamics (SED) theory that a possible solution involves the absorption of zero-point energy. It was shown in 1975 by Boyer that the simplest possible atom and atomic state, the hydrogen atom in its ground state, would be in a state of equilibrium between Larmor radiation and absorption of zero-point energy at the correct radius for a classical Rutherford hydrogen atom.

Since this solution was not known in 1913, Niels Bohr followed a different path by simply postulating that only discrete energy levels were available to the electron in an atom. This line of reasoning let to the development of quantum theory in the 1920s. The concept of classical zero-point energy was forgotten for a decade. However the same concept found itself reborn in a quantum context in 1927 with the formulation of the Heisenberg uncertainty principle. According to the principle, the minimum energy of a harmonic oscillator has the value hf/2, where h is Planck's constant and f is the frequency. It is thus impossible to remove this last amount of random energy from an oscillating system.

Since the electromagnetic field also must be quantized in quantum theory, a parallel is drawn between the properties of a quantum oscillator and the waves of the electromagnetic field. It is concluded that the minimum energy of any possible mode of the electromagnetic field, consisting of frequency, propagation direction and polarization state, is hf/2. Multiplying this energy by all possible modes of the field gives rise to the electromagnetic quantum vacuum, which has identical properties—energy density and spectrum—to the classical zero-point energy studied by Planck, Einstein, Stern and Nernst a decade previously.

The line of inquiry involving classical physics plus the addition of a classical zero-point field was reopened in the 1960s by Trevor Marshall and Timothy Boyer and has been named stochastic electrodynamics (SED). SED asks the question: "Which quantum properties, processes or laws can be explained in terms of classical physics with the only addition being a zero-point electromagnetic field." Two of the early successes were a classical derivation of the blackbody spectrum (i.e. one not involving quantum physics) and the discovery that a classically orbiting electron in a hydrogen atom emitting Larmor radiation but absorbing zero-point radiation would have an equilibrium orbit at the classical Bohr radius. An initial approach to this problem by Timothy Boyer (1975) was perfected by H. E. Puthoff (1987). Their analyses treated the orbiting electron as a harmonic oscillator.

This result underwent a major new development with the recent work of Daniel Cole and Y. Zou which simulated the orbit of a classical electron in a true Coulomb field of a hydrogen nucleus and found that such a realistic electron would find itself in a range of distances from the nucleus, in agreement with quantum mechanics, owing to the random nature of the emission and absorption processes. The mean position is at the correct Bohr radius, but the actual distribution of positions very precisely duplicates the electron probability distribution of the corresponding Schrödinger equation in which the electron is regarded as being represented by a wave function. (In the SED representation the electron is "smeared out" not because it is a wave function, but because as a point-like particle it is subject to the continuous perturbations of the electromagnetic quantum vacuum fluctuations.)

A clear consequence of this theory is that a reduction of the electromagnetic quantum vacuum at the frequency corresponding to the orbit of the electron will result in a decay of the orbit since there will thereby be an imbalance in the Larmor radiation vs. absorption.

The electromagnetic quantum vacuum energy spectrum is proportional to the cube of the frequency. If the vacuum energy is suppressed at the frequency of the "normal" orbit of the electron, this will cause the electron to spiral inward to a higher frequency orbit. In this fashion it will then encounter a new equilibrium situation with the electromagnetic quantum vacuum energy spectrum owing to that spectrum's increase with the cube of the frequency.

If the SED interpretation is correct for the hydrogen atom as the analyses of Boyer, Puthoff, Cole and Zou indicate, it must apply as well to all other atoms and their multi-electron configurations. In that case, a transition of an electron from an excited state to a lower energy state involves a rapid decay from one stable orbit to another, not an instantaneous quantum jump. The details of the bases for stability of electron orbits has yet to be determined by SED theory, but the logical extrapolation from the single-electron hydrogen case is clear: electron orbits in all atoms must be determined by an emission vs. absorption balance and thus are subject to modification involving mode suppression of the electromagnetic zero-point field at appropriate frequencies.

It is claimed that modification of electron orbits is in essence the same process as natural transition between energy levels of electrons in atoms and therefore that the energy released in such a process can be captured in the same way as ordinary transition energy.

By moving an atom into and out of a microstructure that suppresses appropriate modes of the electromagnetic quantum vacuum, an extraction of energy from the electromagnetic quantum vacuum may be accomplished. This can be done with micro Casimir cavities.

The electromagnetic quantum vacuum as a real source of energy is indicated by the Lamb shift between s and p levels in hydrogen, van der Waals forces, the Aharanov-Bohm effect, and noise in electronic circuits.

However the most important effect of the electromagnetic quantum vacuum is the existence of the Casimir Force, a force between parallel conducting plates which may be interpreted as a radiation pressure effect of electromagnetic quantum vacuum energy. Electromagnetic waves in a cavity whose walls are conducting are constrained to certain wavelengths for reasons having to do with transverse component boundary conditions on the wall surfaces. As a result, in a Casimir cavity between parallel plates there will be, in effect, an exclusion of radiation modes whose wavelengths are longer than the separation of the plates. An overpressure of electromagnetic quantum vacuum radiation on the outside then pushes the plates together. An extensive literature exists on the Casimir force and the reality of the force has moved from laboratory experimentation to micro-electro-mechanical structures (MEMS) technology both as a problem (so-called "stiction") and as a possible control mechanism.

The exclusion of modes does not begin all at once at the wavelength equivalent to the plate separation, d. Mode suppression will be strongest for wavelengths of d or greater, but will begin to occur as well for wavelengths falling in between the "stairway" d/n, with the effect diminishing as n increases. We propose to use the partial suppression of modes for wavelengths shorter than d occurring in this fashion in order to be able to employ Casimir cavities of the maximum possible physical size.

Researchers have shown that thermodynamic laws are not violated when energy is "extracted" from zero-point energy, as energy is still conserved and the second law is not violated. Cole and Puthoff have carried out and published thermodynamic analyses showing that there is no violation. Indeed, a thought experiment by Forward (1984) showed a simple, but not practical, energy extraction experiment.

In the stochastic electrodynamics (SED) interpretation of the hydrogen atom, the ground state is interpreted as effectively equivalent to a classically orbiting electron whose velocity is c/137. The orbit is stable at the Bohr radius owing to a balance between classical electromagnetic emission and absorption from the electromagnetic zero-point field. This view, first obtained by Boyer (1975) and subsequently refined by Puthoff (1987) has been further strengthened by the detailed simulations of Cole and Zou (2003, 2004) which demonstrate that the stochastic motions of the electron in this interpretation reproduce the probability density distribution of the Schrödinger wave function. Note that one apparent difference between this interpretation and that of quantum mechanics is that in quantum mechanics the 1s state of the electron is regarded as having zero angular momentum, whereas in the SED interpretation the electron has an instantaneous angular momentum of $mcr/137=h/2\pi$. However SED simulations by Nickisch have shown that the time-averaged angular momentum is zero just as in the quantum case owing to the zero-point perturbations on the orbital plane. Thus averaged over enough "orbits" this "classical electron" will fill a spherical symmetric volume around the nucleus having the same radial probability density as the Schrödinger wave function and zero net angular momentum, completely consistent with quantum behavior.

The Bohr radius of the atom in the SED view is 0.529 A (Angstroms). This implies that the wavelength of zero-point radiation responsible for sustaining the orbit is $2*\pi*0.529*137=455$ A (0.0455 microns). It is claimed that suppression of zero-point radiation at this wavelength and shorter in a Casimir cavity will result in the decay of the electron to a lower energy state determined by a new balance between classical emission of an accelerated charge and zero-point radiation at $\lambda<455$ A, where $\lambda$ depends on the Casimir plate separation, d. Note that the tail end of the quantum probability density of the electron (as well as the SED simulation of Cole and Zou) extends beyond five Bohr radii, so that some change in the energy balance could be accomplished even at considerably longer wavelengths of perhaps 0.1 microns-0.2 microns Since the frequency of this orbit is $6.6\times10^{15}$ s$^{-1}$, no matter how quickly the atom is injected into a Casimir cavity the process will be a slow one as experienced by the orbiting electron. We therefore assume that the decay to a new sub-Bohr ground state will involve gradual release of energy in the form of heat, rather than a sudden optical radiation signature.

Since the binding energy of the electron is 13.6 eV, we assume that the amount of energy released in this process would be on the order of 1 to 10 eV for injection of the hydrogen atom into a Casimir cavity of d=250 A or thereabouts (and perhaps even a larger cavity as noted above). Upon exiting the cavity the electron would absorb energy from the zero-point field and be re-excited to its normal state. The energy (heat) extracted in the process comes at the expense of the zero-point field, which in the SED interpretation flows at the speed of light throughout the Universe. We are in effect extracting energy locally and replenishing it globally. Imagine extracting thimbles-full of water from the ocean. Yes, the ocean is being depleted thereby, but no practical consequences ensue.

Since naturally occurring hydrogen at standard temperature and pressure (STP) is a two-atom molecule, a dissociation process would need to precede an injection of hydrogen atoms into a Casimir cavity. We avoid this complication and take advantage of multi-electron modification by working with monatomic (noble) gases which also have the advantage of being safe and inexpensive.

We work with naturally occurring monatomic gases for three reasons:

(1) No dissociation process is required.
(2) Heavier element atoms are approximately two to four times larger than hydrogen and thus can utilize and be affected by a larger Casimir cavity which is easier to fabricate.
(3) Heavier elements have numerous outer shell electrons, several of which may be simultaneously affected by the reduction of zero-point radiation in a Casimir cavity.

The following five noble gases are potentially suitable:
He (Z=2, r=1.2 A)
Ne (Z=10, r=1.3 A),
Ar (Z=18, r=1.6 A)
Kr (Z=36, r=1.8 A)
Xe (Z=54, r=2.05 A).

All of these elements contain ns electrons. He has two 1s electrons. Ne has two each of 1s and 2s electrons. Ar has two each of 1s, 2s, and 3s electrons. Kr has two of each of 1s, 2s, 3s, and 4s electrons. Xe has two of each of 1s, 2s, 3s, 4s and 5s electrons.

Assuming an outermost electron which is completely shielded by the other electrons (a crude assumption), its orbital velocity would scale as $r^{-1/2}$ (the familiar Keplerian period squared proportional to semi-major axis cubed relationship) and thus $\lambda$ proportional to r/v) will scale as $r^{3/2}$. If that is the case, then the larger radii translate as $r^{3/2}$ into larger Casimir cavities having an effect on the energetics of the outer electron shells. We would therefore expect that a Casimir cavity having d=0.1 microns (or perhaps even as large as one micron would have an effect on reducing the energy levels of the outermost pair of s electrons . . . and possibly also p electrons and intermediate shell s electrons as well.

It is reasonable to expect that a 0.1 microns Casimir cavity would result in a release of 1 to 10 eV for each injection of a He, Ne, Ar, Kr or Xe atom into such a cavity.

According to a Jordan Maclay, who has done theoretical Casimir cavity calculations, a long cylindrical cavity results in an inward force on the cavity. In the "exclusion of modes" interpretation of the Casimir force, this implies that a cylindrical cavity of diameter 0.1 micron would yield the desired decay of outer shell electrons and subsequent release of energy.

It is now recognized that an electromagnetic quantum vacuum field is formally necessary for atomic stability in conventional quantum theory (Milonni 1994). In the field of physics known as stochastic electrodynamics, this concept has been shown by theory and simulations to underlie the ground state of the electron in the hydrogen atom. The classical Bohr orbit is determined by a balance of Larmor emission and absorption of energy from the zero-point fluctuations of the electromagnetic quantum vacuum in SED theory. It follows that upon suppression of appropriate zero-point fluctuations the balance will be upset causing the electron to decay to a lower energy level not ordinarily found in nature with a release of energy during this transition. A Casimir cavity of the proper dimensions can accomplish this suppression of zero-point fluctuations. A Casimir cavity refers to any region in which electromagnetic modes are suppressed or restricted. Upon entering such a properly designed Casimir cavity the electron energy level will shift and energy will be released. Upon exiting the Casimir cavity the electron will return to its customary state by absorbing energy from the ambient zero-point fluctuations. This permits an energy extraction cycle to be achieved at the expense of the zero-point fluctuations. Although it has not yet been proven theoretically, a similar balance of Larmor emission and absorption of energy from the zero-point fluctuations must underlie the electron states of all atoms, not just hydrogen, permitting any atom to be used as a catalyst for extraction of zero-point energy (the energy associated with the zero-point fluctuations). An analogous process is also believed to underlie molecular bonds, yielding a similar energy extraction cycle.

The following is a list of patents that deal with related phenomena:

U.S. Pat. No. 5,018,180, Energy conversion using high charge density, Kenneth R. Shoulders. This concerns the production of charge clusters in spark discharges. It is conjectured that the electrostatic repulsion of charges is overcome in charge clusters by a Casimir-like force. This invention does not deal with energy release from atoms in Casimir cavities and is therefore not relevant to the present invention.

U.S. Pat. No. 5,590,031, System for converting electromagnetic radiation energy to electrical energy, Franklin B. Mead and Jack Nachamkin. This invention does not deal with energy release from atoms in Casimir cavities and is therefore not relevant to the present invention.

U.S. Pat. No. 6,477,028, Method and apparatus for energy extraction, Fabrizio Pinto. Proposes to vary one or more of a variety of physical factors that affect the Casimir force, or by altering any of a variety of environmental factors that affect such physical factors and thereby render a Casimir force system as non-conservative. This invention does not deal with energy release from atoms in Casimir cavities and is therefore not relevant to the present invention.

U.S. Pat. No. 6,593,566, Method and apparatus for energy extraction, Fabrizio Pinto. A method and apparatus for accelerating and a decelerating particles based on particle surface interactions. This invention does not deal with energy release from atoms in Casimir cavities and is therefore not relevant to the present invention.

U.S. Pat. No. 6,665,167, Method for energy extraction-I, Fabrizio Pinto. Similar to U.S. Pat. No. 6,477,028. This invention does not deal with energy release from atoms in Casimir cavities and is therefore not relevant to the present invention.

SUMMARY OF THE INVENTION

A system is disclosed for converting part of the energy of the electromagnetic quantum vacuum available at any point in the universe to usable energy in the form of heat, electricity, mechanical energy or other forms of power. This is accomplished using an effect on the electron configurations of atoms predicted by the theory of stochastic electrodynamics (SED). Within the context of SED theory it is predicted that the electron energy levels in atoms are determined by a balance of Larmor radiation vs. absorption of radiative energy from the electromagnetic quantum vacuum. By suppressing electromagnetic quantum vacuum energy at appropriate frequencies a change may be effected in the electron energy levels which will result in the emission or release of energy. This change in energies is analogous to a standard emission of a photon as an electron makes a transition from an excited to a lower energy state, but on a longer time scale and with the change being a continuous one rather than a "jump" from one energy level to another. Mode suppression of electromagnetic quantum vacuum radiation is known to take place in Casimir cavities. A Casimir cavity refers to any region in which electromagnetic modes are suppressed or restricted. When atoms enter into suitable micro Casimir cavities a decrease in the orbital energies of electrons in atoms will thus occur, with the effect being most pronounced for outer shell electrons. Such energy will be captured in the claimed devices. Upon emergence form such micro Casimir cavities the atoms will be re-energized by the ambient electromagnetic quantum vacuum. In this way energy is extracted locally and replenished globally from and by the electromagnetic quantum vacuum. This process may be repeated an unlimited number of times. This process is also consistent with the conservation of energy in that all usable energy does come at the expense of the energy content of the electromagnetic quantum vacuum. Two example variations of a system are disclosed that permit multiple extractions of electromagnetic quantum vacuum energy during passage of a gas through a series of micro Casimir cavities and that operate in a self-sustaining, recycling fashion. Similar effects may be produced by acting upon molecular bonds. The disclosed devices are scalable in size and energy output for applications ranging from replacements for small batteries to power plant sized generators of electricity. Since the electromagnetic quantum vacuum is thought to permeate the entire Universe, devices drawing power from the electromagnetic quantum vacuum in the fashion claimed will be effectively inexhaustible sources of power.

BRIEF DESCRIPTION OF THE DRAWINGS

The present invention may be understood by reference to the following detailed description taken in conjunction with the drawings briefly described below.

DETAILED DESCRIPTION

Figure 1:
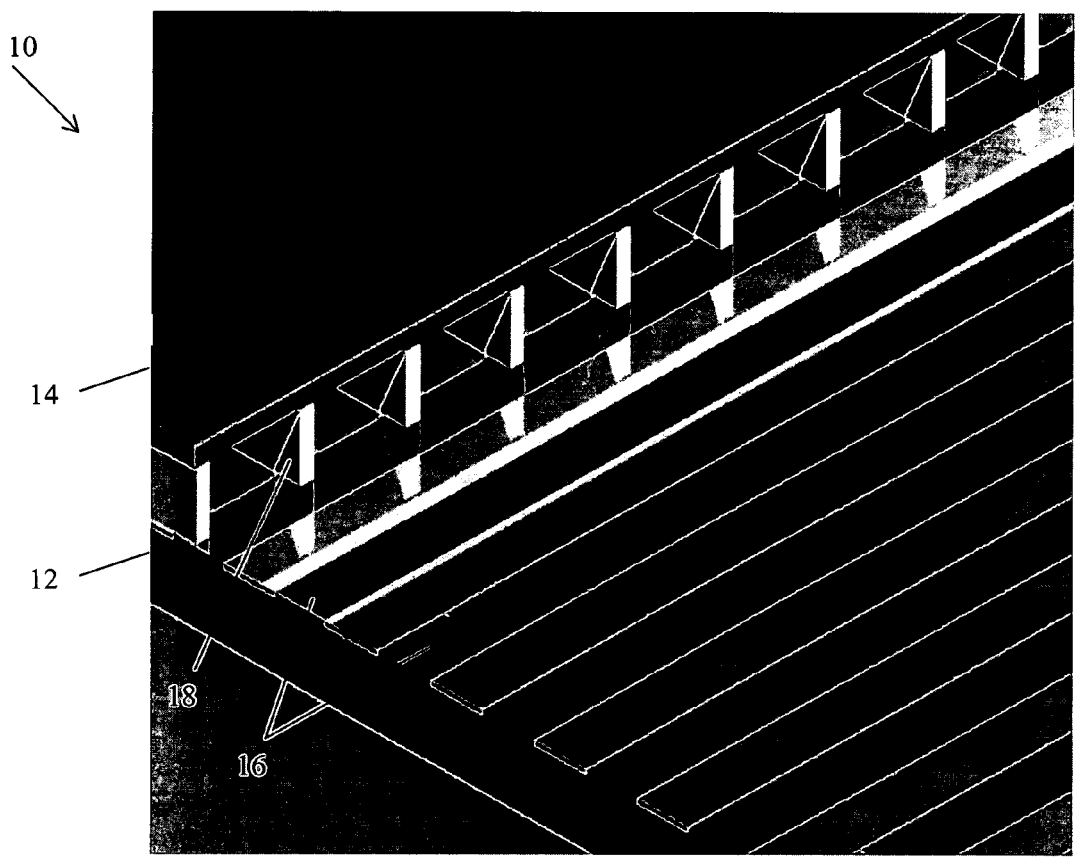
FIG. 1 is a diagrammatic illustration of a set of channels each containing a multiplicity of Casimir cavities in accordance with the present invention.

The first embodiments of this concept utilize Casimir cavities consisting of volumes through which, or in and out of which, gases flow, and which on the size scales of atoms appear as regions bounded by parallel plates of conducting material in which the plate scales are much larger than the plate separations; or by cylinders of conducting material in which the lengths of the cylinders are much larger than the diameters. It is claimed that other forms of Casimir cavity are capable of producing a similar effect, and the term Casimir cavity will be used to designate any volume capable of mode suppression of the zero-point field. The necessary condition is that the mode suppression ability of the Casimir cavity be matched to the electron energy levels in such a way as to result in a significant difference of the electron energy levels inside vs. outside the cavity.

These embodiments demonstrate the following concepts:

A method, comprising: (a) use of a device including a series of Casimir cavities and causing a specific gas to flow through the cavities, said Casimir cavities being configured and said specific gas being selected such that as the gas flows through the cavities energy is released from the gas; and (b) means for collecting at least some of said released gas.

A method, comprising: (a) providing a device including at least one Casimir cavity and causing a specific gas to enter and then exit the cavity, said Casimir cavity being configured and said specific gas being selected such that when the gas is caused to enter the cavity, energy is released from the gas; and (b) means for collecting at least some of said released energy.

A means for effecting changes in the electron configurations. A system for converting part of the energy of the electromagnetic quantum vacuum available at any point in the Universe to usable energy in the form of heat, electricity, mechanical energy or other forms of power.

A means for effecting changes in the electron configurations in the process of which energy is released.

A means for allowing the electron configurations to be re-energized by exposure to the ambient electromagnetic quantum vacuum radiation.

The use of microstructures consisting of many pairs of alternating Casimir cavities and regions in which the electromagnetic quantum vacuum radiation freely propagates.

The use of conducting strips on facing pairs of plates so that atoms go through alternating regions in which they are exposed to the full electromagnetic quantum vacuum spectrum, and regions in which part of the spectrum is blocked. The result is that they dump (or radiate) the energy difference into the local medium.

The use of spacers to separate the layer pairs.

The use of multiple conducting strips to amplify the effect (hugely).

The stacking of such plates with strips on both sides so that the top of one pair becomes the bottom of the next, each with identical conducting strips which form Casimir cavities with their partner strips in each pair.

The use of sandwiched layers of alternating conducting and non-conducting plates having micron sized thicknesses in which micron or submicron diameter holes are introduced by etching or some other method.

The stacking, co-registration and alignment of such sandwiched layers to produce many parallel Casimir tunnels having alternating Casimir and non-conducting segments.

The use of multiple segments to amplify the effect (hugely).

The use of monatomic gases as the medium in such a system.

The use of molecular gases in such a system for the purpose of modifying molecular bonds with the attendant release of energy.

A closed recycling system in which these processes take place.

Fabricatable and workable configuration and dimensions but with the claims not limited to these specific embodiments.

A means whereby the flow of gas is initiated and maintained in a closed system.

A means whereby the energy released from the electron orbital changes is converted into usable energy in the form of heat, electricity, mechanical energy or other forms of power.

Casimir Channels

This embodiment shown in FIG. 1 involves two square parallel plates 12 and 14, 10×10 cm in size for illustration. On each one lay down 5000 conducting strips 16 that are 10 microns in width and the full 10 cm in length, separated by 10 microns non-conducting strips. Perpendicular to the strips deposit a spacer material 18 at 0.1 to 1 cm intervals with a height of 0.1 microns. Put the plates face to face and align the strips so as to form 5000 Casimir strips.

If we assume a gas flow rate of 10 cm/s parallel to the spacers and perpendicular to the strips, this would result in $1.3 \times 10^{20}$ transitions/s.

An energy release of 1 to 10 eV per transition corresponds to 21 to 210 watts of energy release for the entire Casimir cavity. A stacked set of 10 or more such layers could be fabricated yielding 210 to 2100 watts for a 10×10×10 cm block.

This may be directly converted into electricity using a thermophotovoltaic process, or indirectly by using a heat exchanger. As in the previous embodiment, one means of capturing the emitted radiation is to surround the apparatus with a water bath.

The dimensions above are solely examples. The device may be scaled to both smaller and significantly larger dimensions.

Figure 2:
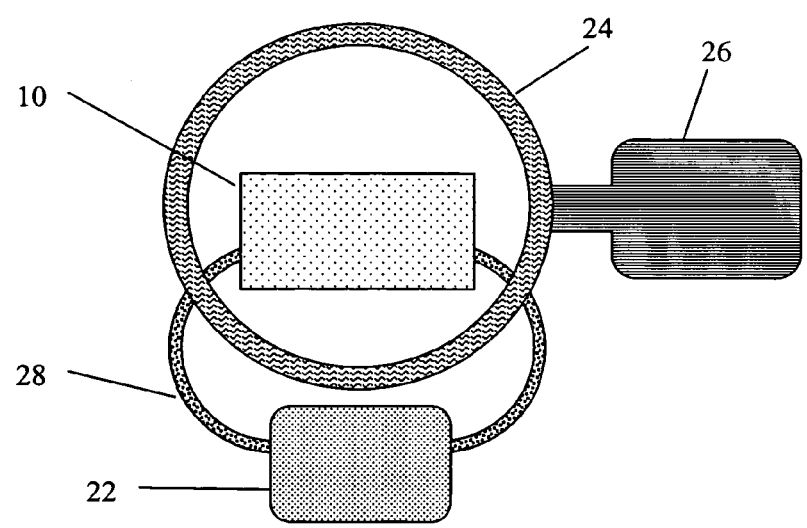
FIG. 2 is a diagrammatic illustration of a system for converting quantum vacuum energy into locally usable power in accordance with the present invention.

The essential components of an energy generating device of this sort shown in FIG. 2 are:

(1) An array of parallel Casimir channels with conducting strips 10

(2) A pump 22 providing continuous recycling of gas through the tunnels (3) A means 24 for capturing the emitted energy (4) A thermal photovoltaic, heat exchanger or other device 26 capable of converting output heat into electricity or other usable forms of power.

A desirable property of the system is its ability to radiate the accumulated energy locally and absorb it globally. Thus surprisingly the means 24 for capturing the emitted energy can capture the emitted energy without hindering the capture of the quantum vacuum energy by the gas. This is due to the fact that the vacuum field permeates all space and cannot be blocked. (Note that the reason that Casimir cavities have reduced vacuum energy modes is not that they block it, but rather that because of destructive interference they do not allow some of the electromagnetic modes to exist in their interior.) A second reason that the means 24 does not block the capture of the quantum vacuum energy is that the absorbed energy is dominantly shorter wavelength electromagnetic modes that are not absorbed by the means 24, whereas the radiated energy can be longer wavelengths for which the means 24 has a much larger absorption coefficient. Such is the case, for example, when the means 24 comprises a water bath.

The first two components will be enclosed in sealed structure. The third and fourth components may be interior or exterior to this structure.

A variation on the above device consists of stacking plates such that the top of one pair becomes the bottom in the next pair, etc.

Casimir Tunnels

Figure 3:
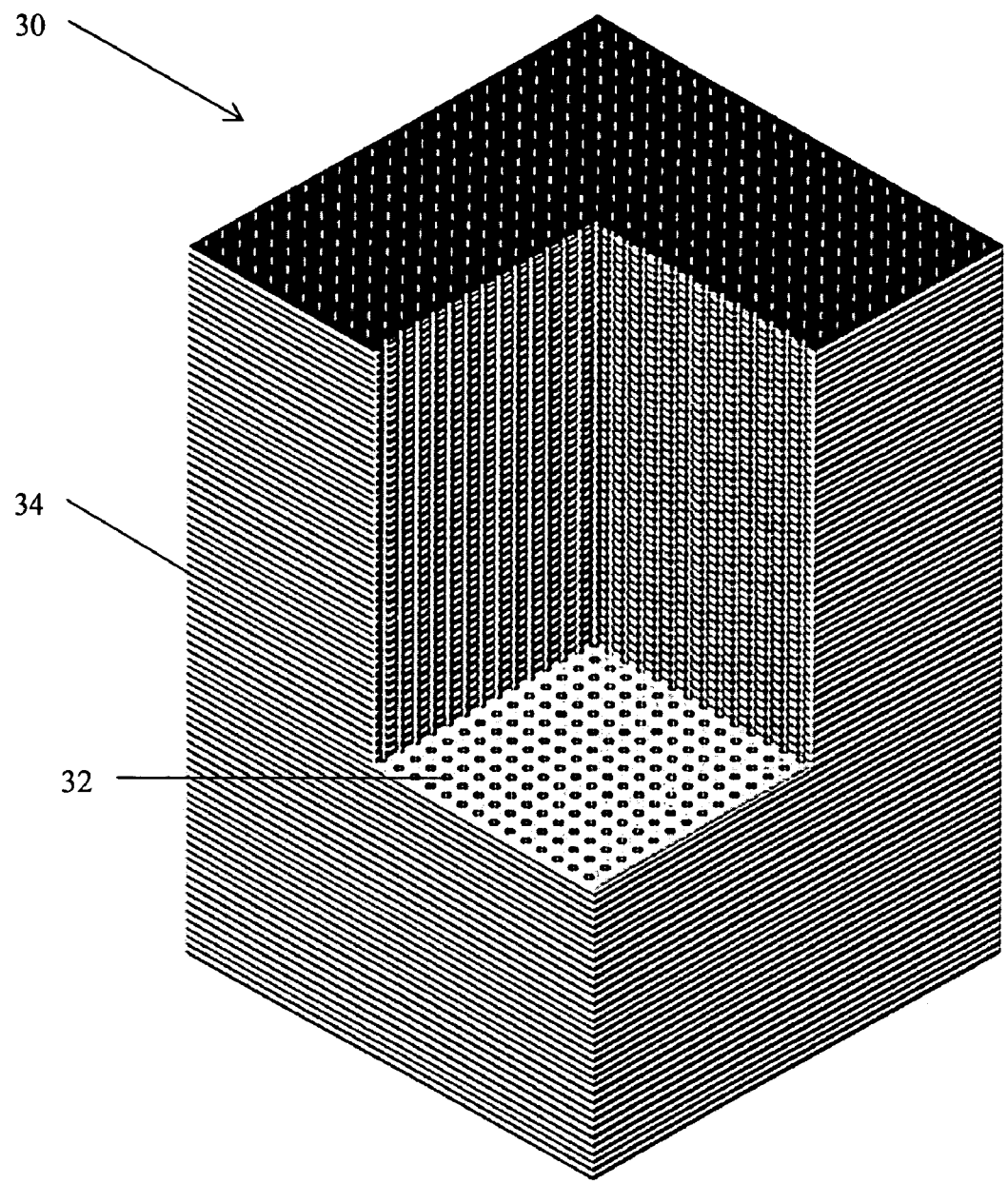
FIG. 3 is a diagrammatic illustration of a block of tunnels each containing a multiplicity of Casimir cavities in accordance with the present invention.

One embodiment of the concept shown in FIG. 3 is multiple, parallel, 0.1 micron diameter Casimir tunnels. If we let the length of the cylinder be 100 times the width, this results in z=10 microns for the length of the Casimir tunnel. We propose a segmented tunnel consisting of alternating conducting and non-conducting materials, each 10 microns in length. In a length of 1 cm, there could be 500 such pairs in segments, resulting in 500 energy releases events (each yielding 1 to 10 eV) for each transit of an atom through the entire 1 cm-long segmented Casimir tunnel.

Consider a one cubic cm "Casimir Block" that is built up of 10 micron thick alternating layers as shown in FIG. 3. Assume that tunnels 32 of 0.1 micron diameter could be drilled through the cube perpendicular to the layers 34 (this is not physically possible, of course; tunnel manufacture must be done differently). Ten percent of the cross section comprises entrance to some 1.3 billion tunnels. The amount of energy released would be proportional to the flow rate of the gas through these tunnels.

A flow rate of 10 cm s$^{-1}$ through a total cross sectional area of 0.1 cm$^2$ yields 1 cm$^3$ of gas per second flowing through the tunnels, which at STP would be $2.7 \times 10^{19}$ atoms. A very simple sealed, closed-loop pumping system could maintain such a continuous gas flow. Since each atom interacts 500 times during its passage, there would be $1.3 \times 10^{22}$ transitions per second in the entire cube of one cubic centimeter. An energy release of 1 to 10 eV per transition corresponds to 2150 to 21500 watts of energy release for the entire Casimir cube of segmented tunnels.

Obviously it is not possible to drill 1.3 billion tunnels having diameters of 0.1 microns. However it is feasible to use microchip technology to etch holes into the individual layers first and then assemble the stack. Extremely fine coregistration and alignment of stacks will need to be accomplished.

This may be directly converted into electricity using a thermophotovoltaic process, or indirectly by using a heat exchanger.

One means to capture the emitted energy is to surround the apparatus with a water bath. Water absorbs infrared radiation very effectively. For the wavelength range of 2 microns to 200 microns, the absorption coefficient of water is greater than 10 cm$^{-1}$. Therefore a layer of water that is 1 mm thick and surrounds the apparatus will be sufficient to absorb nearly all the emitted infrared radiation. The water will be heated, and that heat converted into the desired form of energy.

The dimensions above are solely examples. The device may be scaled to both smaller and significantly larger dimensions.

The essential components of an energy generating device of this sort are:
(1) An array of parallel segmented Casimir tunnels 32
(2) A pump 22 providing continuous recycling of gas through the tunnels
(3) A means 24 for capturing the emitted energy
(4) A thermal photovoltaic, heat exchanger or other device 26 capable of converting output heat into electricity or other usable forms of power.

The first two components will be enclosed in sealed structure. The third and fourth components may be interior or exterior to this structure.

Casimir Channels in Bonded Wafers

The basic concept of the present invention is to flow gas into and out from multiple Casimir cavities. When the gas is outside of a Casimir cavity, a wide range of quantum mechanical vacuum electromagnetic modes are available to interact with the gas's atomic electronic orbital states. When the gas passes into a Casimir cavity the range of available modes is restricted and the gas sheds some of its electromagnetic energy such that this energy is available locally. When the gas once again flows out from the Casimir cavity, the gas's atomic electronic orbital state energy is recharged from quantum mechanical vacuum fields. Thus energy is harvested globally and delivered locally.

Figure 4A:
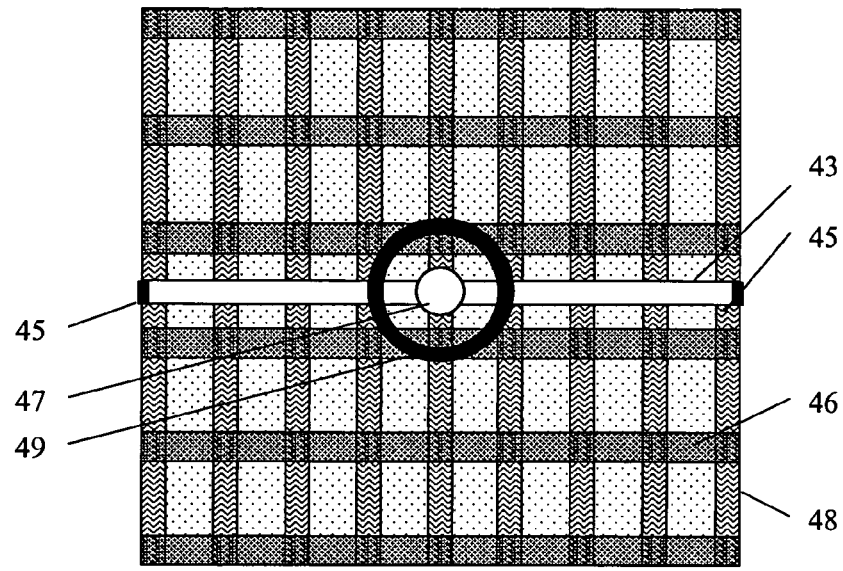
FIGS. 4A-4D are diagrammatic illustrations of Casimir channels in bonded wafers in accordance with the present invention.
Figure 4B:
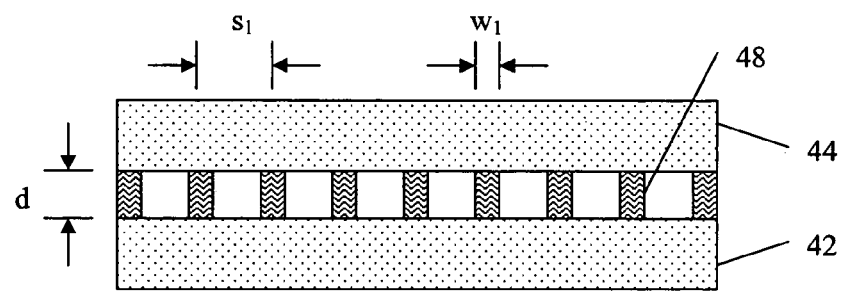
Figure 4C:
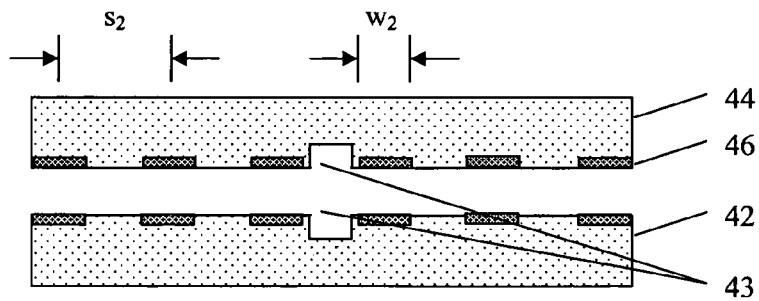
Figure 4D:
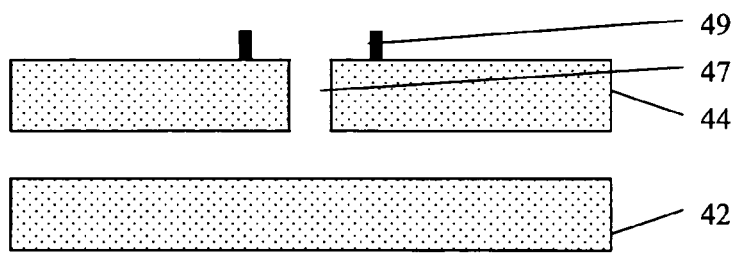

The configuration for a basic device comprising bonded wafers is shown in FIGS. 4A-4D. A top view is shown in FIG. 4. The device is 1 sq. cm. As seen from the south edge 41 in FIG. 4B, it consists of two substrates 42 and 44 separated by a series of spacers which extend across the device from the south to the north side. These spacers have a height d, a width $w_1$, and a center-to-center spacing $s_1$. The thin gaps delineated by the spacers 48 extend to openings at the south edge of the device, as seen in FIG. 4B and the north edge. As seen from the east edge in FIG. 4C, the upper 44 and lower 42 substrates are each coated with conducting stripes 46 that extend from the east edge to the west edge. These stripes are discontinuous, such that the discontinuity occurs at each region where the stripe is intersected by a spacer 48. These stripes have a width $w_2$ and a center-to-center spacing $s_2$. In the central region of the device there is a region of both substrates that has been removed to form a conduit 43 from close to the east edge to close to the west edge. This conduit does not extend all the way to the edges, but is instead sealed 45 at each end, as shown in FIG. 4A. Finally, as seen in FIG. 4D, which shows an east view of the central cross section, and in FIG. 4A, a hole 47 extends through the upper substrate. This hole connects to the conduit 43 shown in FIGS. 4A and 4C. As can also be seen in FIGS. 4A and 4D, a connector ring 49 that surrounds the hole is affixed to the upper substrate.

For the device to function, gas tubing 28, shown in FIG. 2, is attached to the connector ring 49 extending from the upper substrate, forming a sealed connection. Pressurized gas flows through the tubing and the hole 47 in the upper substrate into the conduit 43 between the substrates. From the conduit 43 the gas flows from the central region through the gap between the substrates to the north and south edges. The spacers guide the gas so that it flows alternately between regions coated with the conducting stripes 46 and regions that are not coated with these stripes, until it reaches the north and south edges, at which point it escapes from the gap between the substrates. The escaped gas is captured in a surrounding enclosure, not shown, and pumped back through the tubing 28 into the hole at the top center of the device, forming a close-loop system. In this way the gas is passed through multiple Casimir cavities. The gas atoms or molecules absorb energy from the surrounding electromagnetic field when they are in the non-conducting region and then release a portion of their energy as they enter the gap between the conductive coatings, i.e., in the Casimir cavity.

The apparatus is surrounded by a means 24 to capture the released energy, such as a water bath, shown in FIG. 2. Water absorbs infrared radiation very effectively. For the wavelength range of 2 microns to 200 microns, the absorption coefficient of water is greater than $10 \text{ cm}^{-1}$. Therefore a layer of water that is 1 mm thick and surrounds the apparatus is sufficient to absorb a large proportion of the emitted infrared radiation, providing thermal energy to heat the water. That energy can be used directly as heating source, or converted into the desired form of energy, by means 26 well known to those skilled in the art.

The materials and dimensions in the preferred embodiment are as follows. The upper 44 and lower 42 substrates are sapphire, which is transparent to much of the ambient electromagnetic spectrum, is thermally conductive, and is rigid and robust. The thickness of each substrate is 250 microns. The conducting regions 46 are formed by standard photolithography known to those skilled in the art. The width of each conducting stripe, $w_2$, is 2 microns, and separated by a 2 micron nonconducting region, to form a center-to-center spacing $S_L$ of 4 microns. The stripe has gaps where the spacers 48 are to be formed. The conductive coating 46 is platinum, having a thickness of 40 nm. The spacers 48 consist of silicon dioxide, deposited and patterned by standard means known by those skilled in the art. The total spacer height, d, is 200 nm, its width, $w_1$, is 5 microns, and the center-to-center spacing, $s_1$, is 0.5 mm. The spacers are formed by depositing 100 nm thick layers on each substrate, and then joining them. The central conduit regions 43 are cut into the substrates using a standard diamond saw. The cuts are 100 microns in width and 50 microns in depth, forming a conduit that is approximately a 100 micron square. The hole 47 drilled through the upper substrate has a diameter of 1 mm, and is surrounded by a ring having a diameter of 2.5 mm. The ring 49 is affixed to the upper substrate by epoxy. The substrates are pressure bonded together by direct bonding (Plöl, 1999), with the bond forming between the silicon dioxide spacers layers on each substrate.

The steps in the device fabrication that are not described explicitly are well known to those skilled in the art.

Following the calculations presented in the background section, the power produced by a single such device is estimated to be between 1 and 10 watts for an input pressure of 8 atmospheres.

Pumping gas through the Casimir pores requires power. We examine how much power is required, as a check that it is not more than is produced by the device. Consider a Casimir block that contains 200 nm diameter pores over a 1 $cm^2$ area, having a thickness of 1 cm and a porosity of 0.25. We find the pressure and power required to produce a flux of 1 $cm^3$ per second at standard temperature and pressure (STP):

According to FIG. 10(*a*) in a paper by Roy et al. (1993) a pressure drop of 760 torr (equal to one atmosphere) results from a flow of approximately 5 $mol/m^2$-s through a thickness of 60 microns, which corresponds to a gas velocity of 10 cm/s. Reducing the velocity by a factor of ten, making the appropriate unit conversions and multiplying the result by the thickness ratio of 1 cm ($10^4$ microns) divided by 60 microns gives the result that a pressure of 1700 Pa, corresponding to 17 atmospheres, is required to produce the desired gas flow. Multiplying this by the gas flux of 1 $cm^3$ $s^{-1}$ results in a required power of 1.7 milliwatts. These results are only approximate, as temperature and structural variations through the Casimir pores are expected to produce resistance which will then require a somewhat greater pressure. In any case the required power of approximately 1.7 milliwatts is much lower than our estimate of 2.2 to 22 kilowatts of power release, and so much more power is produced than is used to produce the gas flow.

It is to be understood that the dimensions and materials can be varied greatly and still be part of this invention. The following is a list of some such variations, but it is far from exhaustive:

i. The substrates may be other insulating or partially conducting materials, such as silicon, glass, ceramic, plastic, etc.

ii. The conducting stripes can be formed of other conductors, such as copper, aluminum, gold, sliver, silicides, transparent conductors such as indium tin oxide, etc.

iii. Instead of depositing the stripes so that they protrude from the surface and potentially interfere with the gas flow, they may be recessed, either by etching recesses into which the conductors are deposited, or by using planarization techniques to coat an insulating layer between the stripes, using techniques well known in the industry.

iv. The spacer materials can be formed from polymers used, for example, as photoresist and electron-beam resist, from metals, and other materials.

v. Instead of depositing spacers they may be formed by the etching of one or both of the substrates to form grooves.

vi. The spacer height may be from 1 nm to many microns.

vii. The substrates may be bonded by pressure bonding or the use of adhesives, such as cyanoacrylics.

viii. The dimensions of the overall structure may be varied from the distance between a single pair of spacers and conductor/nonconductor region to large plates that are many meters in width.

ix. The individual devices may be sandwiched together to form thick structures. For example, in place of the 250 micron thick substrates, micro-sheet having a thickness of 50 microns or far less may be used so that dense structures are formed.

x. The working fluid may be a wide variety of gases, in addition to the noble gases described earlier, so that all mentions of gas atoms may be extended to molecules of various types.

xi. The working fluid may be a liquid, so that all mentions of gases and gas atoms may be extended to liquids of various types. For operation within approximately of 100° C., one possible liquid is ethylene glycol. For high temperature operation, the liquid can be sodium.

xii. Micro-motors formed using micro-electro-mechanical systems (MEMS) technology can be used to pump the gas through the channels.

xiii. The Casimir cavities may be composed of carbon nanotubes.

xiv. The pattern may be formed using self-assembled layers.

xv. The device may incorporate a naturally formed structure. For example, diatom shells (Goho, 2004a) consist of silicon dioxide patterned with features, including holes, that are tens of nanometers in size. They can be coated as needed with conductors to form Casimir cavities.

xvi. The water bath may be replaced with any other material or device that absorbs substantially the released energy wavelengths. Such materials include glass, organic polymers, thermophotovoltaic devices, among many possibilities known to those skilled in the art.

xvii. Rather than surrounding the entire apparatus, the absorbing material may be placed in the apparatus, for example coating the channels through which the gas flows. Such placement can allow the absorber to reside within roughly an emission wavelength of the gas that is releasing the energy.

Gas Oscillating Through Casimir Channels

The device described in the previous embodiment exposes the gas atoms to a very large number of transitions between Casimir cavity regions (between conducting layers) and exposed regions (without the conducting layers) by pumping them across multiple transitions. Instead of pumping gas through the device, gas atoms can simply be oscillated back and forth between Casimir cavity and exposed regions.

A simple way to visualize this, but not necessarily the most efficient working device, is to consider the device of FIGS. 4A-4D, but with the gaps sealed at the north and south edges. Instead of connecting to tubing via the connector ring, the ring is sealed with a thin metal diaphragm. Before sealing the device it is filled with the desired working gas. An ultrasonic transducer is then mated to the diaphragm. When the ultrasonic transducer is powered, it rapidly compresses and decompressed the gas, causing it to oscillate back and forth between Casimir and exposed regions.

Figure 5A:
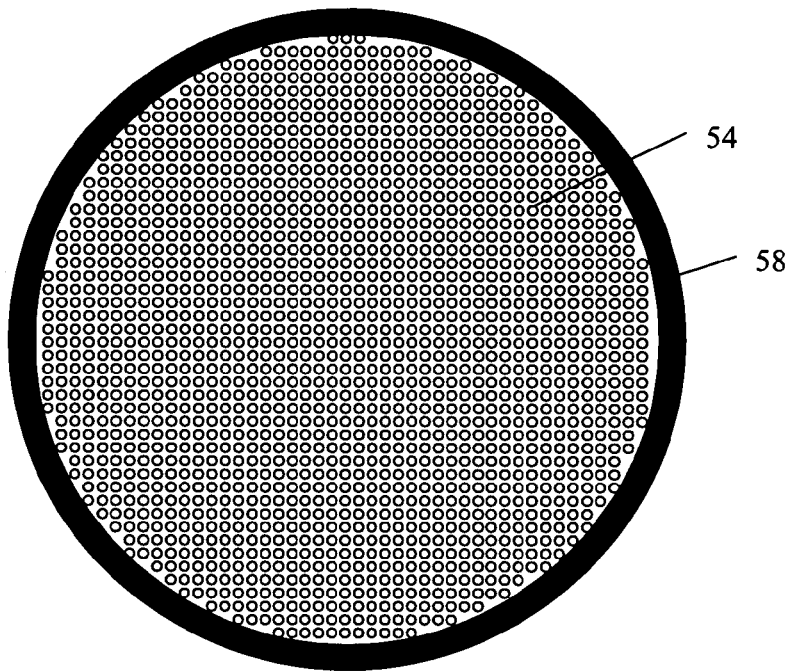
FIGS. 5A-5C are diagrammatic illustrations of a device for oscillating a fluid though Casimir channels in accordance with the present invention.
Figure 5B:
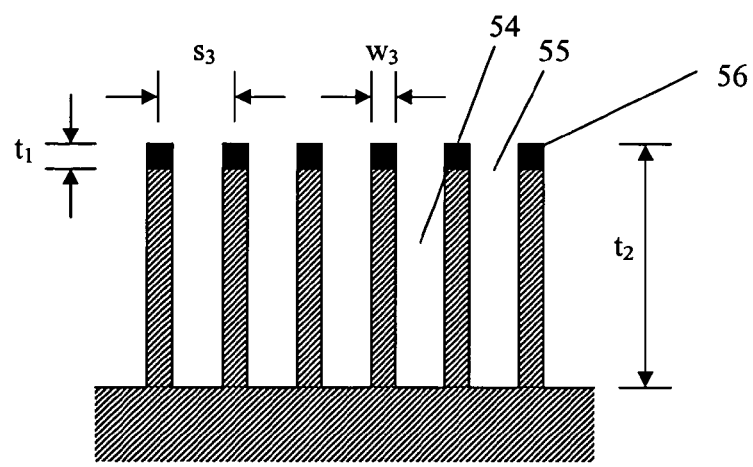
Figure 5C:
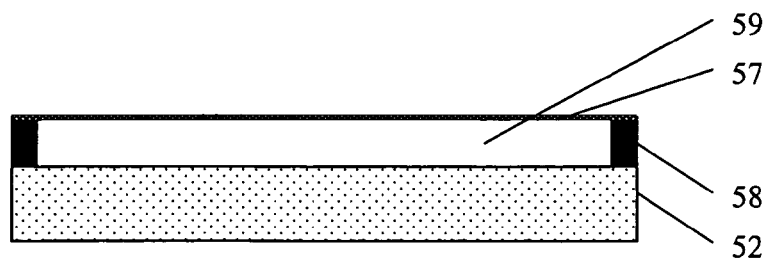

A vertical oscillatory flow device is shown in FIGS. 5A-5C. FIG. 5A shows a top view, in which many small holes 54 are formed in the substrate surface. The device is surrounded by a connector ring 58. A magnified cross section of the holes is shown in FIG. 5B. The holes 54 have a diameter d, a center-to-center spacing s, a depth $t_2$, and the thickness of a conducting region 56 at the surface is $t_1$. A central cross section of the entire device is shown in FIG. 5C. It shows the substrate (holes and conducting layer not shown), the connector ring at the periphery, and a thin diaphragm 57 attached to the top of the connector ring.

The gap and holes are filled with the chosen working gas 59. An ultrasonic transducer or other source of high frequency vibrations is placed in contact with the diaphragm 57 and powered. This produces gas pressure oscillations that force gas atoms past the Casimir region 55 formed at the top of each hole, alternately in upward and downward directions. Instead of a single conducting layer at the top, multiple alternating conducting and non-conducting layers can be formed at the top of the holes, to multiply the effect. As in the embodiment of FIGS. 4A-4D, the apparatus is surrounded by a means for absorbing the released energy, such as a water bath 24.

The device is fabricated as follows. The conducting layer 56 is deposited using vacuum deposition, such as sputtering, or from a liquid by anodic or electroless deposition. The layers are patterned by methods known to those skilled in the art, such as electron-beam lithography or photolithography. Alternatively, the holes 54 can be formed using self-assembled monolayers to create the lithography mask, as known to those skilled in the art. The holes are etched to a high aspect ratio, e.g., ratio of depth-to-diameter of 20, such as by ion milling. The outer ring 58 is attached using epoxy, the region is filled with the desired working gas 59, and the diaphragm 57 is attached with epoxy.

The materials and dimensions in the preferred embodiment are as follows. The substrate 52 is sapphire, and has diameter of 2.54 cm and a thickness of 250 microns. The conducting layer 56 is aluminum, of thickness $t_1$ of 1 micron. The hole 54 depth $t_2$ is 4 microns. The hole diameter d is 0.2 microns and center-to-center spacing s is 0.3 microns.

It is to be understood that the shape, dimensions, modulation techniques and materials can be varied greatly and still be part of this invention. The following is a list of some such variations, but it is far from exhaustive:

i. The Casimir cavities may be composed of carbon nanotubes.

ii. The working fluid may be a wide variety of gases, in addition to the noble gases described earlier, so that all mentions of gas atoms may be extended to molecules of various types.

iii. The working fluid may be a liquid, so that all mentions of gases and gas atoms may be extended to liquids of various types. For operation of up to approximately 100° C., one possible liquid is ethylene glycol. For high temperature operation, the liquid can be sodium.

iv. Instead of actively causing the gas atoms to oscillate into and out from the Casimir cavity regions, the oscillations can result from ambient thermal vibrations (e.g., Brownian motion).

v. The configuration of the device can be similar to that of the MEMS device of FIGS. 7A and 7B (described as part of a later embodiment), such that the working gas is pushed back and forth between the left-hand and right-hand regions.

vi. The pattern may be formed using self-assembled layers.

vii. The device may incorporate a naturally formed structure. For example, diatom shells consist of silicon dioxide patterned with features, including holes, that are tens of nanometers in size. They can be coated as needed with conductors to form Casimir cavities.

viii. The pumping can be driven by a naturally occurring mechanism. For example, some yeast cell have been found to naturally vibrate at 1.6 kHz (Goho, 2004b). This could be used to cause a gas to oscillate back and forth between Casimir cavity and exposed regions.

ix. The water bath may be replaced with any other material or device that absorbs substantially the released energy wavelengths. Such materials include glass, organic polymers, thermophotovoltaic devices, among many possibilities known to those skilled in the art.

x. Rather than surrounding the entire apparatus, the absorbing material may be placed in the apparatus, for example coating the channels through which the gas flows. Such placement can allow the absorber to reside within roughly an emission wavelength of the gas that is releasing the energy.

Casimir Cavities in Flexible Polymer

Rather than moving the working gas by flowing it (FIGS. 4A-4D) or vibrating it into and out of a Casimir cavity (FIGS. 5A-5C), the cavity wall characteristics can be switched, which results in a shift in the cavity's allowed modes. This produces the same result of tapping vacuum electromagnetic energy that the flowing gas device of the embodiment of FIGS. 4A-4D produces. One way to accomplish this is to put the working gas into gaps formed in flexible photonic crystals. A photonic crystal blocks and passes bands of electromagnetic radiation, where the band wavelength ranges depend upon the material properties and spacing of small repeated structures. A flexible photonic crystal can be formed by embedding an array or rigid objects, such as silicon pillars, in a thin film of flexible polymer. The electromagnetic (or optical) properties of such two-dimensional slab photonic crystal structures is well known to those skilled in the art (Park, 2002).

Figure 6A:
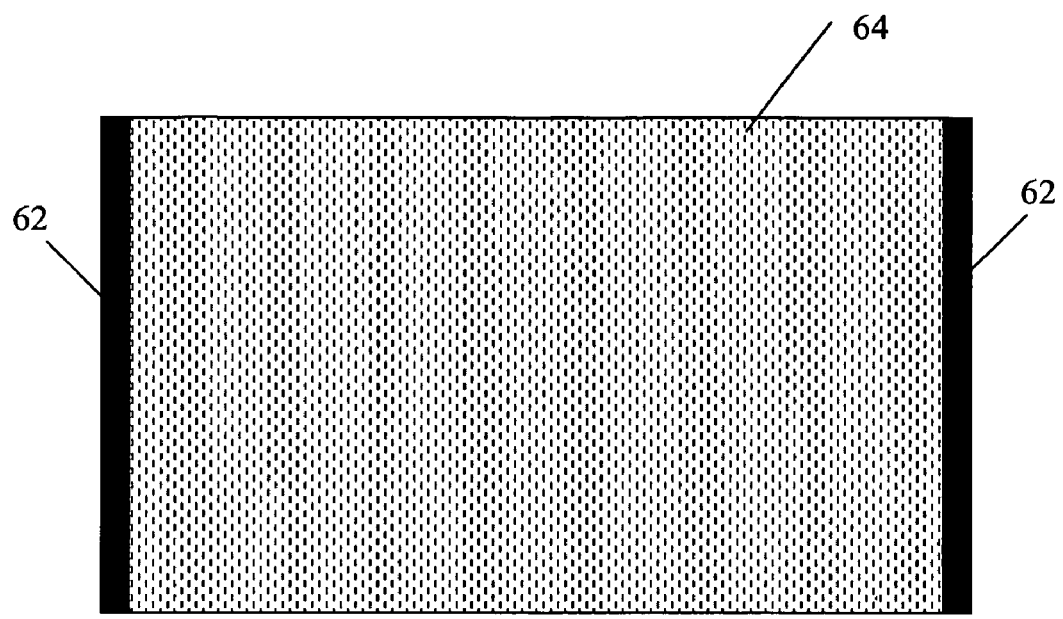
FIGS. 6A and 6B are diagrammatic illustrations of a device switching the reflecting characteristics of walls of Casimir cavities in accordance with the present invention.
Figure 6B:
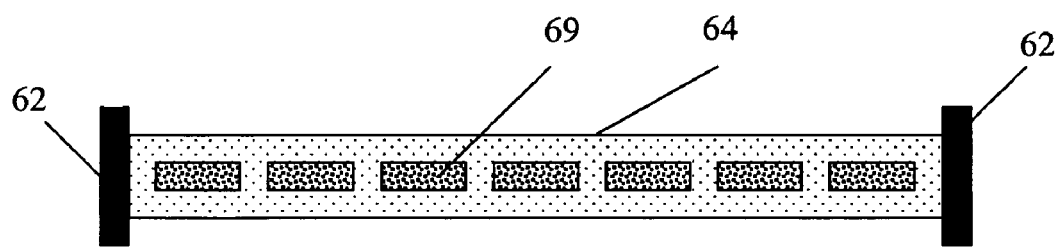

FIGS. 6A and 6B show such a photonic crystal device. FIG. 6A is a top view, showing metal supports 62 at both ends of a polymer film 64. The rigid pillars that form the phonic crystal are buried in the polymer. As the film is stretched in the plane of the paper, the pillar spacing in the plane normal to the paper is decreased, which changes the electromagnetic passband. FIG. 6B is an edge view showing the supports 62, the polymer film 64, and gaps in the film that are filled with the working gas 69. (For clarity, the pillars are not shown.) The gap size is sufficiently narrow to produce a significant Casimir effect, e.g., 200 nm. The length or width need to be sufficiently small to maintain the narrow gap, e.g., 1 micron. The stretching takes place by attaching one support to a stationary object and attaching the other support to a vibrator, such as a piezoelectric crystal, which itself may be attached on its opposing side to another stationary support. As in the embodiment of FIGS. 4A-5D, the apparatus is surrounded by a means for absorbing the released energy, such as a water bath 24.

It is to be understood that the shape, dimensions, modulation techniques and materials can be varied greatly and still be part of this invention. The following is a list of some such variations, but it is far from exhaustive:

i. Instead of stretching the polymer, it can be modulated with an acoustic signal through the air, or through a liquid that surrounds it.

ii. Instead of stretching the polymer, it can be modulated with an ambient thermal vibrations. As the working gas and the structure heats up, the vibrations increase.

iii. The polymer embedded with rigid pillars may be formed into small spheres that are filled with the working gas. These spheres can fill or partially fill a volume in which the pressure is modulated, either by enclosing the volume and modulating the pressure in the entire volume, by passing an acoustic signal through the volume, or by thermal vibrations. This modulation causes the passband of the photonic crystal that surrounds the working gas to vary. Although the shape of the device is substantially different from that of FIGS. 6A-6B, the function is the same.

iv. The working fluid may be a wide variety of gases, in addition to the noble gases described earlier, so that all mentions of gas atoms may be extended to molecules of various types.

v. The working fluid may be a liquid, so that all mentions of gases and gas atoms may be extended to liquids of various types. For operation of up to approximately 100° C., one possible liquid is ethylene glycol. For high temperature operation, the liquid can be sodium.

vi. The water bath may be replaced with any other material or device that absorbs substantially the released energy wavelengths. Such materials include glass, organic polymers, thermophotovoltaic devices, among many possibilities known to those skilled in the art.

vii. Rather than surrounding the entire apparatus, the absorbing material may be placed in the apparatus, for example in the polymer film through which the gas flows. Such placement can allow the absorber to reside within roughly an emission wavelength of the gas that is releasing the energy.

Modulating Casimir Cavity Wall Spacing

Rather than moving the working gas by flowing it (FIGS. 4A-4D), vibrating it into and out of a Casimir cavity (FIGS. 5A-5C), or switching the characteristics of walls of the cavity to change the passbands (FIGS. 6A and 6B), the spacing between the cavity walls can be modulated. This produces the same result of tapping zero point energy that the flowing gas device of the previous embodiments produce. One way to accomplish this is to put the working gas into gaps formed in micro-electro-mechanical systems (MEMS).

MEMS technology makes use of semiconductor lithography techniques to build miniature mechanical devices. The Casimir effect has already been found to be in evidence in MEMS devices. In 2001, Chan and co-workers at Bell Labs Lucent Technologies first demonstrated the effect of the Casimir force in a MEMS device. A gold coated sphere was brought close to a MEMS seesaw paddle, consisting of a polysilicon plate suspended above a substrate on thin torsion rods. The Bell Labs researchers demonstrated the effect of the Casimir force in rocking the plate.

Figure 7A:
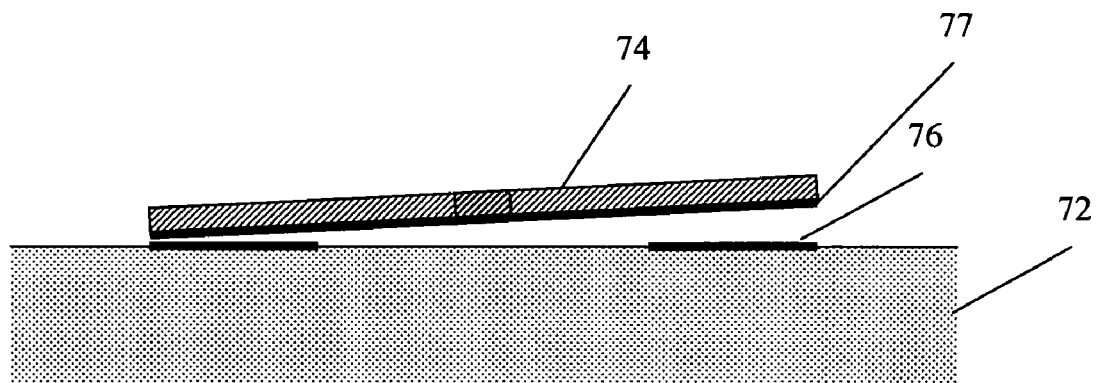
FIGS. 7A and 7B are diagrammatic illustrations of a device Casimir cavity wall spacing in accordance with the present invention.
Figure 7B:
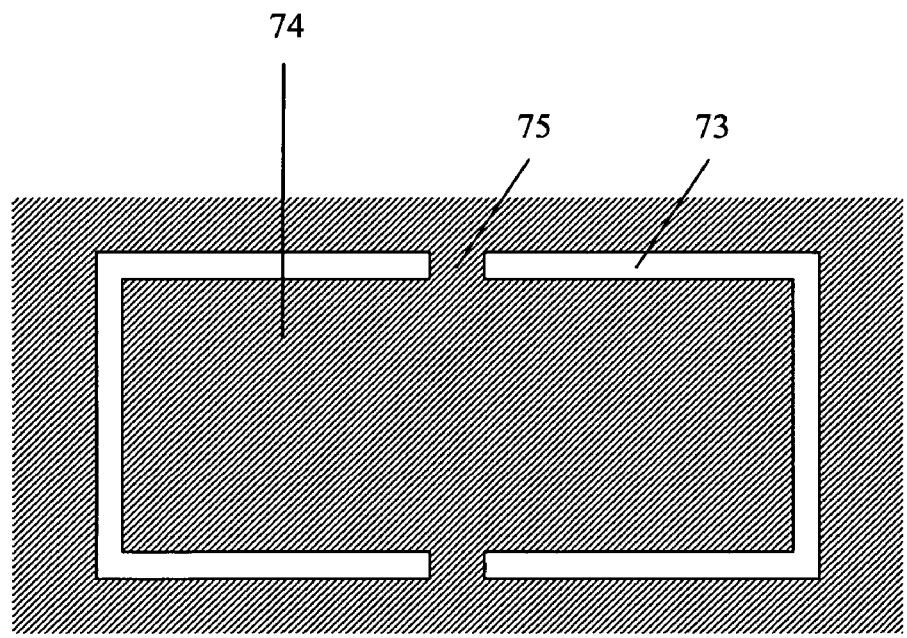

In the current invention we make use of MEMS technology to modulate the spacing between Casimir cavity walls. (Note that we are not making use of the Casimir force to change this spacing, as was done in the Bell Labs demonstration.) The basic MEMS device used to accomplish this is shown in FIGS. 7A and 7B. A side view is shown in FIG. 7A. Two conducting electrodes 76 are shown on the substrate. A pivoting polysilicon plate 74 is shown suspended above the substrate 72. A conducting layer 77 is formed on the underside of this plate. A top view is shown in FIG. 7B. The pivoting plate 74 forms the central rectangular region, which is surrounded by a gap 73. The pivoting arm 75 connects this plate to the surrounding region at the top and bottom of the rectangle. As in the earlier embodiments, the apparatus is surrounded by a means 24 for absorbing the released energy, such as a water bath The device functions as follows. The working gas fills the region between the pivoting plate 74 and the substrate 72. A voltage is applied first between the pivoting plate and the left-hand electrode. This causes the distance between the left side of the plate and the substrate to diminish, thereby changing the dimensions of the Casimir cavity formed by these two surfaces. Then the voltage is instead applied between the pivoting plate and the right-hand electrode. This causes the plate to pivot, such that the distance between the right side of the plate and the substrate diminishes, thereby changing the dimensions of the Casimir cavity formed by these two surfaces. The voltage is switched alternately between these two electrodes, causing the plate to oscillate back and forth. The oscillating action is greatly enhanced by the torsion of the pivots, so that very little energy is required to maintain the oscillation.

The techniques to fabricate such a MEMS device is well known to those skilled in the art.

It is to be understood that the shape, dimensions, modulation techniques and materials can be varied greatly and still be part of this invention. The following is a list of some such variations, but it is far from exhaustive:

i. Instead of using a MEMS device, the Casimir cavity can be formed between a substrate and a suspended conducting sheet. A similar technology has been used to form electrostatic acoustic speakers, albeit with larger spacings.

ii. Gaps can be formed in a polymer, with both sides of the gap coated with a conductor and the gap filled with a working gas. The polymer can then be stretched, as in the embodiment of FIGS. 6A and 6B, such that the spacing of the Casimir cavity formed by the two conductors is modulated. A figure of this would appear much like that depicted in FIG. 6B viii. Instead of stretching the polymer, it can be modulated with an acoustic signal through the air, or through a liquid that surrounds it.

ix. Instead of stretching the polymer, it can be modulated with an ambient thermal vibrations. As the working gas and the structure heat up, the vibrations will increase.

x. The polymer coated on its interior surface with a conductor may be formed into small spheres that are filled with the working gas. These spheres can fill a volume in which the pressure is modulated, either by enclosing the volume and modulating the pressure in the entire volume, by passing an acoustic signal through the volume, or by thermal vibrations. This modulation causes the spacing of the Casimir cavity in which the working gas is contained to vary. Although the shape of the device is substantially different from that of FIGS. 7A and 7B, the function is the same.

xi. The working fluid may be a wide variety of gases, in addition to the noble gases described earlier, so that all mentions of gas atoms may be extended to molecules of various types.

xii. The working fluid may be a liquid, so that all mentions of gases and gas atoms may be extended to liquids of various types. For operation of up to approximately 100° C., one possible liquid is ethylene glycol. For high temperature operation, the liquid can be sodium.

xiii. The water bath may be replaced with any other material or device that absorbs substantially the released energy wavelengths. Such materials include glass, organic polymers, thermophotovoltaic devices, among many possibilities known to those skilled in the art.

xiv. Rather than surrounding the entire apparatus, the absorbing material may be placed in the apparatus, for example coating the substrate and cap of the region containing the gas. Such placement can allow the absorber to reside within roughly an emission wavelength of the gas that is releasing the energy.

We note that the MEMS device of FIGS. 7A and 7B can also be used to move the working gas back and forth between the left-hand and right-hand regions. This function is consistent with the embodiment of FIGS. 5A-5C, in which the working gas is vibrated into and out of a Casimir cavity.

Assymetric Casimir Cavity Entry and Exits Including Absorbing Means

As a prelude to this embodiment, we review the processes involved in the present invention. A general concept of this entire invention is that a gas that is in equilibrium with the ambient electromagnetic modes, which include the vacuum field (also known as the zero point field), is caused to enter a Casimir cavity. For the purposes of this entire invention a Casimir cavity is defined as any region in which the electromagnetic modes are restricted. Upon approaching this region, the electromagnetic modes that the space supports are restricted and the energy of the electron orbitals of the gas atoms is reduced. As a consequence of this reduction the excess energy is emitted and absorbed by the apparatus, providing heat energy. By the time the atoms are in the Casimir cavity, nearly all the excess energy has been radiated (unless the gas flow is extremely fast). The gas atoms pass through the Casimir cavity, and upon emerging from this region to a region that supports a broader range of electromagnetic modes, the energy of the electron orbitals of the gas atoms is again allowed to rise to its previous value. The compensation for the energy deficit is provided from the ambient electromagnetic modes.

One of the tenets of the current invention is that excess energy released when the gas approaches the Casimir cavity is delivered locally and that the energy deficit that must be compensated for when it emerges from the cavity is supplied from global sources. In this way the ambient electromagnetic field is tapped to provide usable energy. There may be conditions in which it is possible that the excess energy release and the deficit energy supply are both local, in which case no net energy is provided. Similarly, there may be conditions in which it is possible that the excess energy release and the deficit energy supply are both global, in which case again no net energy is provided. To avoid these possibilities, we provide an asymmetry in the apparatus to ensure that the excess energy is released locally and that the energy deficit is supplied globally.

Figure 8:
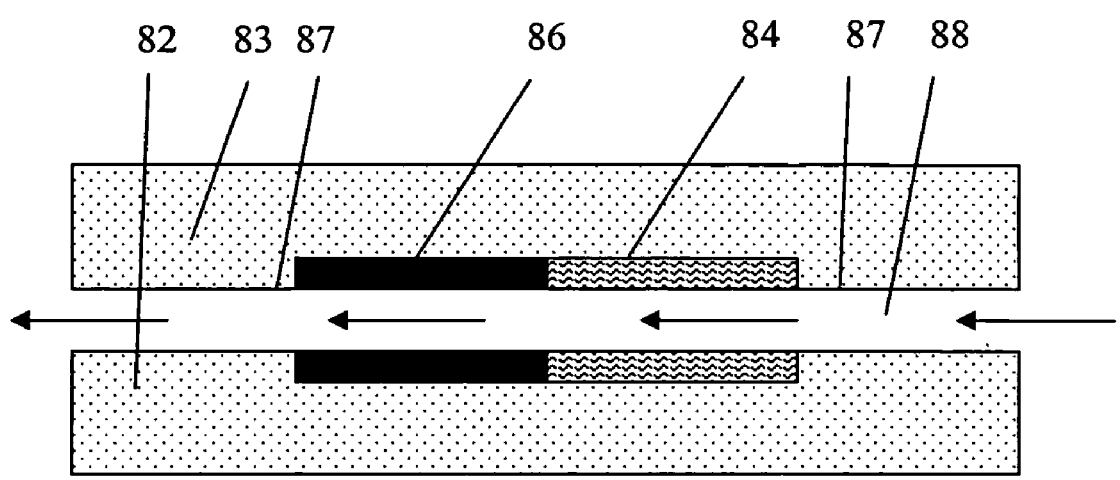
FIG. 8 is a diagrammatic illustration of a device incorporating asymmetric Casimir cavity entry and exits in accordance with the present invention.

The concept of embodiment is shown in FIG. 8. This figure depicts a channel 88, similar to that shown in some of the earlier embodiments. Gas is constricted between two substrates 82 and 83 and flows through the channel in the direction of the arrows. As in the previous cases, gas flows from a region in which the substrate is not coated 87 with a conducting layer to a region in which it is 86. The difference here is that an intermediate region 84 is provided in which the substrates are coated with an absorbing layer. This absorbing region absorbs the excess energy that is radiated from the atoms as they approach the Casimir cavity (conducting) region. The absorbing region is not substantially conducting, and therefore does not substantially restrict the electromagnetic modes that are supported in the region. Upon exiting the Casimir cavity (conducting) region, the atoms pass immediately into another region with no absorbing region 87. Thus upon approaching the Casimir cavity the atoms are forced to deliver their excess energy locally because it is absorbed by the absorbing region 87. Upon emerging from the Casimir cavity the gas atoms are forced to supply their energy deficit non-locally, i.e., globally, because there is no local source for this energy.

As an option, a further aspect of this invention is to situate the absorbing region within roughly one emission wavelength of the gas atoms at the time that they are emitting. No such layer is provided within such a distance when the gas atoms emerge from the Casmir cavity and are supplied with energy. The substrate is chosen such that it does not absorb the emission wavelengths.

The absorbing layers may comprise glass (amorphous silicon dioxide, usually with impurities), and the substrate may comprise sapphire. The glass has a much broader absorption band in the far infrared than does the sapphire. A wide range of other materials may be provided to form the absorbing layers and non-absorbing or less absorbing substrate. Such materials are known to those skilled in the art, and are available in tables and handbooks.

The sequence of regions depicted in FIG. 8 may be repeated to form the sort of multiply striped structure described in the embodiment of FIGS. 4A-4D.

The dimensions of the channel and the apparatus are approximately the same as those of embodiment of FIGS. 4A-4D. Similarly the attachments to provide for gas flow, the spacers, and other aspects of the apparatus are similar to those described in embodiment of FIGS. 4A-4D. The conducting layer length is chosen so that the emerging atoms do not have substantial access to radiation emitted from the absorbing regions. Note that, unlike embodiment of FIG. 2, it is not necessary to surround the apparatus with a means for absorbing the released energy 24, such as a water bath.

The device fabrication is not described explicitly as it is well known to those skilled in the art.

It is to be understood that the dimensions and materials can be varied greatly and still be part of this invention. The following is a list of some such variations, but it is far from exhaustive:

i. The substrates may be other insulating or partially conducting materials, such as silicon, glass, ceramic, plastic, etc.
ii. The conducting stripes can be formed of other conductors, such as copper, aluminum, gold, sliver, silicides, transparent conductors such as indium tin oxide, etc.
iii. The stripes may be recessed in the substrate or they protrude from the surface.
iv. The individual devices may be sandwiched together to form thick structures. For example, in place of the 250 micron thick substrates, micro-sheet having a thickness of 50 microns or far less may be used so that dense structures are formed.
v. The working fluid may be a wide variety of gases, in addition to the noble gases described earlier, so that all mentions of gas atoms may be extended to molecules of various types.
vi. The working fluid may be a liquid, so that all mentions of gases and gas atoms may be extended to liquids of various types. For operation within approximately of 100° C., one possible liquid is ethylene glycol. For high temperature operation, the liquid can be sodium.
vii. Micro-motors formed using micro-electro-mechanical systems (MEMS) technology can be used to pump the gas through the channels.
viii. The Casimir cavities may be composed of carbon nanotubes.
ix. The pattern may be formed using self-assembled layers.

The device may incorporate a naturally formed structure. For example, diatom shells consisting of silicon dioxide patterned with features, including holes, that are tens of nanometers in size. To the extent necessary, these can be coated as needed with conductors to form Casimir cavities.

REFERENCES

Boyer, T. H. 1975, Random Electrodynamics: The Theory of Classical Electrodynamics with Classical Zero-Point Radiation Field, Phys. Rev. D, 11, 790.
Cole, D. C. and Puthoff, H. E. 1993, Extracting energy and heat from the vacuum, Phys. Rev. E, 48, 2, 1562.
Cole, D. C. and Zou, Yi 2003, Quantum Mechanical Ground State of Hydrogen Obtained from Classical Electrodynamics, Physics Letters A, Vol. 317, No. 1-2, pp. 14-20 (13 Oct. 2003), quant-ph/0307154.
Cole, D. C. and Zou, Yi 2004, Analysis of Orbital Decay Time for the Classical Hydrogen Atom Interacting with Circularly Polarized Electromagnetic Radiation, Phys. Rev. E. 69 (1), 016601, pp. 1-12 (2004).
Forward, R. 1984, Extracting electrical energy from the vacuum by cohesion of charged foliated conductors, Phys. Rev. B, 30, 4, 1700.
Goho, A., "Diatom Menagerie," Science News, Vol. 166, Jul. 17, 2004a, pp. 42-44, and references mentioned therein.
Goho, A., "Rattle and Hum; Molecular machinery makes yeast cells purr," Science News, Vol. 166, Aug. 21, 2004b, p. 116, and references therein.
Milonni, P. W. The Quantum Vacuum: An Introduction to Quantum Electrodynamics, Sect. 3.3, Academic Press, 1994.
Park, W., and Summers, C. J., "Extraordinary refraction and dispersion in 2D photonic crystal slabs", Opt. Lett., Vol 27, (2002) p. 1397.
Plöl, A. and Kräuter, G., "Wafer direct bonding: tailoring adhesion between brittle materials", Mater. Sci. Eng. R, Vol 25 (1999) p. 1.
Puthoff, H. E., Ground State of Hydrogen as a Zero-Point-Fluctuation-Determined State, Phys. Rev. D 35, 3266, 1987.
Roy, Subrata et al., "Modeling gas flow through microchannels and nanopores," Journal of Applied Physics, Vol. 93, No. 8, Apr. 15, 2003, pp. 4870-4879.

What is claimed is:

1. A system for extracting and collecting electromagnetic radiation from the ambient surroundings, comprising:
   (a) a supply of fluid characterized by its ability to (i) take in electromagnetic radiation from the ambient surroundings and (ii) release at least some of said energy when the fluid is caused to pass into a Casimir cavity;
   (b) a first arrangement configured to collect at least some of the electromagnetic radiation released by said fluid;
   (c) a second arrangement including means defining a given path for containing said fluid along said path;
   (d) a third arrangement including a Casimir cavity positioned within said given path and cooperating with said second arrangement such that said fluid is caused to pass into and out of the cavity as the fluid is contained along said given path, said Casimir cavity being positioned in sufficient communication with the ambient surroundings and with said first arrangement so as to (i) cause said fluid containing electromagnetic energy taken from the ambient surroundings to release at least some of said energy to said first arrangement when the fluid passes into said cavity and (ii) to again take in electromagnetic energy from the ambient surroundings when the fluid passes out of said cavity.

2. A system according to claim 1 wherein said second arrangement is configured such that said fluid is caused to flow along said path into and out of said Casimir cavity.

3. A system according to claim 1 wherein said second and third arrangements are configured such that said Casimir cavity is caused to move with respect to said fluid such that the fluid is in turn caused to pass into and out of said Casimir cavity.

4. A system according to claim 3 wherein said third arrangements configured so as to cause said Casimir cavity to move back and forth between first and second spaced apart positions.

5. A system according to claim 1 wherein said means defining said given path defines a closed passageway for containing said fluid and wherein said second arrangement is configured such that the same fluid is caused to cycle into and out of said Casimir cavity.

6. A system according to claim 5 wherein said passageway defines a looped path and wherein said second arrangement includes a mechanism configured to cause said fluid to flow around said path through said passageway into and out of said Casimir cavity.

7. A system according to claim 5 wherein said second arrangement includes a mechanism for causing said fluid to flow back and forth through said passageway into and out of said Casimir cavity.

8. A system according to claim 7 wherein said absorbing material is a liquid.

9. A system according to claim 8 wherein said liquid material is water.

10. A system according to claim 1 wherein said fluid is a gas.

11. A system according to claim 10 wherein said gas is a monatomic gas.

12. A system according to claim 10 wherein said gas is a molecular gas.

13. A system according to claim 1 wherein said first arrangement includes a container of material for absorbing electromagnetic energy, said absorbing material surrounding at least said Casimir cavity.

14. A system according to claim 1 wherein said Casimir cavity includes opposing walls and wherein said third arrangement is configured so as to cause the position of said Casimir cavity walls to move back and forth between first and second spaced positions.

15. A system for extracting and collecting electromagnetic energy from the ambient electromagnetic quantum vacuum, comprising:
 (a) a first arrangement defining at least one Casimir cavity configured to cause gas containing electromagnetic energy obtained from the ambient electromagnetic quantum vacuum to release at least some of said energy when said gas is passed into said cavity;
 (b) a second arrangement located in the ambient electromagnetic quantum vacuum and including a source of said gas and a mechanism cooperating with said first arrangement so as to cause said gas to pass from the ambient electromagnetic quantum vacuum into said Casimir cavity and then out of said cavity and back into the ambient electromagnetic quantum vacuum, whereby the gas when passing into said Casimir cavity releases at least some of its energy and then, upon passing back into the ambient electromagnetic quantum vacuum, again takes in electromagnetic energy from the ambient electromagnetic quantum vacuum, said means and said first arrangement cooperating with one another such that said fluid passes into and out of said Casimir cavity by relative movement between the cavity and gas; and
 (c) a third arrangement for capturing at least some of the electromagnetic energy released by said fluid, said third arrangement including means located in a position with respect to said Casimir cavity such that at least some of the electromagnetic energy released by said gas is captured by said absorber.

16. A system, comprising:
 (a) a first arrangement including a number of Casimir cavities, each of which is configured to cause fluid containing electromagnetic energy obtained from the ambient surroundings to release at least some of said energy when said fluid is passed into said cavity;
 (b) a second arrangement located in the ambient surroundings and including a source of said fluid and means cooperating with said first arrangement for causing said fluid to pass from the ambient surroundings into each of said Casimir cavities and then out of the cavity and back into the ambient surroundings, whereby the fluid when passing into said Casimir cavities releases at least some of its energy and then, upon passing back into the ambient surroundings, again takes in electromagnetic energy from the ambient surroundings, said means and said first arrangement cooperating with one another such that said fluid passes into and out of said Casimir cavities by relative movement between the cavities and fluid; and
 (c) a third arrangement for capturing at least some of the electromagnetic energy released by said fluid.

17. A system according to claim 16 wherein said means includes at least one fluid passageway extending from the ambient surroundings into and though said Casimir cavities and back into the ambient surroundings and wherein said Casimir cavities are defined by a series of conducting strips located within said passageway, said series of conducting strips including a first group of spaced apart strips located on one side of the passageway and a second groups of spaced apart strips on a opposite side of said passageway in alignment with respective strips of said first group, each of said aligned pair of strips being positioned relative to one another to produce a Casimir cavity.

18. A method, comprising:
 (a) providing a first arrangement defining at least one Casimir cavity configured to cause fluid containing electromagnetic energy obtained from the ambient surroundings to release at least some of said energy when said fluid is passed into said cavity;
 (b) providing a source of said fluid;
 (c) causing said fluid to pass from the ambient surroundings into said Casimir cavity and then out of said cavity and back into the ambient surroundings such that the fluid when passing into said Casimir cavity releases at least some of its energy and then, upon passing back into the ambient surroundings, again takes in electromagnetic energy from the ambient surroundings, said fluid being cause to pass into and out of said Casimir cavity by relative movement between the cavity and fluid; and
 (c) capturing at least some of the electromagnetic energy released by said fluid.

19. A method of extracting and collecting electromagnetic radiation from the ambient surroundings, comprising:
 (a) providing a supply of fluid characterized by its ability to (i) take in electromagnetic radiation from the ambient surroundings and (ii) release at least some of said energy when the fluid is caused to pass into a Casimir cavity;
 (b) providing a first arrangement configured to collect at least some of the electromagnetic radiation released by said fluid;
 (c) providing a second arrangement including means defining a given path for containing said fluid along said path;
 (d) providing a third arrangement including a Casimir cavity positioned within said given path;
 (e) causing said fluid to pass into and out of the cavity as the fluid is contained along said given path; and (f) positioning said Casimir cavity in sufficient communication with the ambient surroundings and with said first arrangement so as to (i) cause said fluid containing electromagnetic energy taken from the ambient surroundings to release at least some of said energy to said first arrangement when the fluid passes into said cavity and (ii) to again take in electromagnetic energy from the ambient surroundings when the fluid passes out of said cavity.

20. A system, comprising:

(a) a first arrangement defining at least one mechanism designed to cause the atoms and molecules making up a given fluid containing electromagnetic energy obtained from the ambient surroundings to change in configuration in a way which releases at least some of said energy when said fluid is passed into said mechanism;

(b) a second arrangement located in the ambient surroundings and including a source of said fluid and means cooperating with said first arrangement for causing said fluid to pass from the ambient surroundings into said mechanism and then out of said mechanism and back into the ambient surroundings, whereby the fluid when passing into said mechanism releases at least some of its energy and then, upon passing back into the ambient surroundings, again takes in electromagnetic energy from the ambient surroundings, said means and said first arrangement cooperating with one another such that said fluid passes into and out of said mechanism by relative movement between the mechanism and fluid; and (c) a third arrangement for capturing at least some of the electromagnetic energy released by said fluid.

* * * * *